United States Patent
Sakuma (10) Patent No.: US 7,673,508 B2
(45) Date of Patent: Mar. 9, 2010

(54) THERMAL TYPE FLUID FLOW SENSOR

(75) Inventor: Noriyuki Sakuma, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 11/964,105

(22) Filed: Dec. 26, 2007

(65) Prior Publication Data

US 2008/0168650 A1 Jul. 17, 2008

(30) Foreign Application Priority Data

Jan. 15, 2007 (JP) .............................. 2007-005982

(51) Int. Cl.
*G01F 1/68* (2006.01)
(52) U.S. Cl. .................................. 73/204.26
(58) Field of Classification Search ............... 73/204.26
See application file for complete search history.

(56) References Cited

U.S. PATENT DOCUMENTS

| | | | | |
|---|---|---|---|---|
| 4,831,876 A * | 5/1989 | Porth et al. | ............... | 73/204.16 |
| 5,237,867 A * | 8/1993 | Cook, Jr. | ................. | 73/204.15 |
| 5,369,994 A * | 12/1994 | Hecht et al. | ............... | 73/204.16 |
| 5,423,212 A * | 6/1995 | Manaka | .................... | 73/204.26 |
| 5,464,966 A * | 11/1995 | Gaitan et al. | ................. | 219/544 |
| 5,623,097 A * | 4/1997 | Horiguchi et al. | ........ | 73/204.15 |
| 6,112,591 A * | 9/2000 | Manaka | .................... | 73/204.26 |
| 6,349,596 B1 * | 2/2002 | Nakada et al. | ........... | 73/204.26 |
| 6,378,365 B1 * | 4/2002 | Tu | ........................... | 73/204.26 |
| 6,516,785 B1 * | 2/2003 | Nakada et al. | ........... | 73/204.26 |
| 6,684,694 B2 * | 2/2004 | Fujiwara et al. | .......... | 73/204.26 |
| 6,698,283 B2 * | 3/2004 | Wado et al. | .............. | 73/204.26 |
| 6,871,536 B2 * | 3/2005 | Ariyoshi | .................. | 73/204.26 |
| 2006/0207320 A1 * | 9/2006 | Yamada et al. | ........... | 73/204.26 |

FOREIGN PATENT DOCUMENTS

| | | |
|---|---|---|
| JP | 08-054269 | 2/1996 |
| JP | 10-311750 | 11/1998 |
| JP | 2002-277483 | 9/2002 |

* cited by examiner

*Primary Examiner*—Harshad Patel
(74) *Attorney, Agent, or Firm*—Antonelli, Terry, Stout & Kraus, LLP.

(57) ABSTRACT

A thermal-type fluid flow sensor technology for measuring more precisely the temperature of the heater for an improved sensibility of detecting flow measurements. The thermal-type fluid flow sensor for measuring the air flow rate includes a heating resistive element formed on the semiconductor substrate through a first insulating layer, temperature-measuring resistive elements for heating resistive element for measuring the temperature of the heating resistive element, upstream and downstream temperature-measuring resistive elements for detecting the temperature of air on the upstream side and the downstream side of the air heated by the heating resistive element, and an air temperature measuring resistive element for measuring the temperature of the air heated by the heating resistive element, and at least the temperature-measuring resistive element for the heating resistive element is disposed in the upper layer or lower layer of the heating resistive element.

15 Claims, 8 Drawing Sheets

THERMAL TYPE FLUID FLOW SENSOR

CLAIM OF PRIORITY

The present application claims priority from Japanese application JP 2007-005982 filed on Jan. 15, 2007, the content of which is hereby incorporated by reference into this application.

FIELD OF THE INVENTION

The present invention relates to a thermal-type fluid flow sensor technology and in particular to a thermal-type fluid flow sensor technology suitable to a thermal-type fluid flow meter for measuring the intake air of an internal engine.

BACKGROUND OF THE INVENTION

Traditionally, as thermal-type fluid flow sensor used in the air flow meter for measuring the quantity of intake air fitted in the electronically controlled fuel injection device of an internal engine of an automobile and the like, thermal-type products have constituted the main stream because they can detect directly the mass quantity of air. Among them, the thermal-type air flow sensor produced by the semiconductor micro-machining technology has attracted attention in particular because it can reduce cost and be driven with a low power.

As the prior art for such air flow sensor, for example, JP-A No. 8 (1996)-54269 proposes one in which a heater and two sensors sandwiching this heater are disposed in the center of the sensor. In order to secure the precision of measurement of this air flow sensor, the consistence at all times of the environment of sensors is a premise. Therefore, it is necessary to control temperature so that there may be a predetermined difference of temperature between the heater temperature and the temperature of air that flows in.

And JP-A No. 10 (1998)-311750 proposes one in which an intake air sensor for measuring air that flows in addition to the heater and temperature sensor are disposed. For example, if the predetermined temperature difference is set at 100° C., a feedback control is made so that the heater temperature may be 120° C. against an intake temperature of 20° C. For this purpose, the direct heater resistance value has been used in the product having the configuration. However, the elements deteriorated due to the heating of the heater itself, and the resulting change in the resistance value made it difficult to maintain precision.

As a means of solving this problem, JP-A No. 2002-277483 proposes the disposition of a heater temperature sensor for measuring the heater temperature beside the heater so that the heater temperature may always be maintained without being subjected to the impact of any heater deterioration.

SUMMARY OF THE INVENTION

However, regarding the control of the heater temperature, from the viewpoint of assuring as much precision as possible, in the traditional structure of measuring the heater temperature beside the heater, it is difficult to reduce the distance between the heater and the heater temperature detecting sensor to several μm or less due to the problem of precision of processing the heater or other metal films and the possibility of coating the insulating film to be formed in the upper layer thereof. Only temperatures lower than the heater temperature have been detected, sensibility of detection has fallen down and thus this constituted a factor of harming precision.

Therefore, the object of the present invention is to provide a thermal fluid flow sensor technology for measuring more precisely the heater temperature and improving the sensibility of detecting flow rate measurements.

The above object can be achieved by adopting a layered structure with a heater and a sensor disposed through an insulating film and by disposing the sensor for detecting the heater temperature above or below the heater.

We shall list up below characteristic embodiments of the present invention.

(1) The thermal-type fluid flow sensor of the present invention includes a heating resistive element formed on the semiconductor substrate through the first insulating layer, a temperature-measuring resistive element for measuring the temperature of the heating resistive element, upstream and downstream temperature-measuring resistive element for detecting the temperature of air on the upstream side and the downstream side of the air heated by the heating resistive element, and an air temperature-measuring resistive element for measuring the temperature of air before being heated by the heating resistive element in the thermal-type fluid flow sensor for measuring the flow rate of air, in which at least the temperature-measuring resistive element for the heating resistive element is disposed in the upper layer or the lower layer of the heating resistive element.

(2) In the thermal-type fluid flow sensor with the configuration described above, the temperature-measuring resistive elements for the heating resistive element are disposed in the upper layer or the lower layer of the heating resistive element through the second insulating layer.

The upstream and downstream temperature-measuring resistive elements are disposed in the upper layer or the lower layer of the heating resistive element through the second insulating layer.

And the temperature-measuring resistive element for measuring air temperature is disposed in the upper layer or the lower layer of the heating resistive element through the second insulating layer.

(3) In the thermal-type fluid flow sensor with the configuration described above, the upstream side and downstream side temperature-measuring resistive elements are in the same layer as the temperature-measuring resistive elements for the heating resistive element, and are disposed in such a way that they sandwich the temperature-measuring resistive element for the heating resistive element.

(4) In the thermal-type fluid flow sensor with the configuration described above, the temperature-measuring resistive elements for the heating resistive element, the upstream side and downstream side temperature-measuring resistive elements and the temperature-measuring resistive element for measuring the air temperature are in the same layer and are disposed in the upper layer or the lower layer of the heating resistive elements.

(5) In the thermal-type fluid flow sensor with the configuration described above, the heating resistive element includes at lease a metal nitride compound from among TiN (titanium nitride), TaN (tantalum nitride), MoN (molybdenum nitride) and WN (tungsten nitride), or at least a metal silicide compound from among WSi (tungsten silicide), MoSi (molybdenum silicide), CoSi (cobalt silicide) and NiSi (nickel silicide), or a metal film constituted mainly by at least one from among β-Ta (beta tantalum), Mo (molybdenum), α-Ta (alpha tantalum), Ti (titanium), W (tungsten), Co (cobalt), Ni (nickel), Ta (iron), Nb (niobium), Hf (hafnium), Cr (chromium), Zr (zirconium), Pt (platinum) and Poly-Si.

(6) In the thermal-type fluid flow sensor with the configuration described above, the resistance ratio of the heating resistive element is 100 μΩ·cm or more.

(7) In the thermal-type fluid flow sensor with the configuration described above, the temperature-measuring resistive element for the heating resistive element includes at least a metal film mainly constituted by Mo (molybdenum), α-Ta (alpha tantalum), Ti (titanium), W (tungsten), Co (cobalt), Ni (nickel), Fe (iron), Nb (niobium), Hf (hafnium), Cr (chromium), Zr (zirconium), Pt (platinum) and β-Ta (beta tantalum), or a metal nitride compound such as TiN (titanium nitride), TaN (tantalum nitride), MoN (molybdenum nitride), and WN (tungsten nitride), or at least a metal silicide compound from among WSi (tungsten silicide), MoSi (molybdenum silicide), CoSi (cobalt silicide) and NiSi (nickel silicide).

(8) In the thermal-type fluid flow sensor with the configuration described above, the resistance temperature coefficient of the temperature-measuring resistive element for the heating resistive element, the temperature-measuring resistive element, and the air temperature-measuring resistive element is 2,000 ppm/° C. or more.

(9) In the thermal-type fluid flow sensor with the configuration described above, the wiring width of the heating resistive element is equal to or wider than the wiring width of the temperature-measuring resistive element for the heating resistive element.

(10) In the thermal-type fluid flow sensor with the configuration described above, the film width of the first insulating layer between the heating resistive element and the temperature-measuring resistive element for the heating resistive element is 0.5 μm or less.

(11) In the thermal-type fluid flow sensor with the configuration described above, the first insulating film described above is constituted by a multilayered insulating film.

And a third insulating layer is disposed in the upper layer of the temperature-measuring resistive element for the heating resistive element, the upstream and downstream temperature-measuring resistive element, and the air temperature-measuring resistive element.

And the third insulating layer is constituted by a multilayered insulating layer.

(12) The manufacturing method of thermal-type fluid flow sensor includes the steps of:

forming successively a first insulating film and a first metal film on the semiconductor;

etching the first metal film by using the resist pattern formed by the photo lithography as a mask to form a heating resisting element made of the first metal film;

forming successively the second insulating film and the second metal film on the heating resistive element;

etching the second metal film by using the resist pattern formed by the photo lithography as a mask to form a temperature-measuring resistive element for a heating resistive element made of the second metal film, upstream and downstream temperature-measuring elements for detecting the temperature of air on the upstream and the downstream of the air heated by the heating resistive element, an air temperature-measuring resistive element for measuring the air temperature of the air before being heated by the heating resistive element, and extraction wiring to be connected with each of the resistive elements;

forming a third insulating film in the upper layer of the temperature-measuring resistive element for the heating resistive element, the upstream and downstream temperature-measuring resistive elements, and the air temperature-measuring resistive element;

etching the third insulating film by using the resist pattern formed by the photo lithography process to form connecting holes for exposing a part of the extracting wiring made of the second metal film, and forming a resist pattern by the photo lithography process on the back of the semiconductor substrate and wet etching a part of the semiconductor substrate by using the resist pattern as a mask to form a diaphragm at a position located in an area where the heating resistive element, the temperature-measuring elements for the heating resistive element, and the upstream and downstream temperature-measuring elements.

In the manufacturing method of thermal-type fluid flow sensor having the configuration described above, the heating resistive element includes at least a metal nitride compound from among TiN (titanium nitride), TaN (tantalum nitride), MoN (molybdenum nitride) and WN (tungsten nitride), or at least a metal silicide compound from among WSi (tungsten silicide), MoSi (molybdenum silicide), CoSi (cobalt silicide) and NiSi (nickel silicide), or a metal film constituted mainly by at least one from among β-Ta (beta tantalum), Mo (molybdenum), α-Ta (alpha tantalum), Ti (titanium), W (tungsten), Co (cobalt), Ni (nickel), Ta (iron), Nb (niobium), Hf (hafnium), Cr (chromium), Zr (zirconium), Pt (platinum) and Poly-Si.

(14) In the manufacturing method of thermal-type fluid flow sensor, the temperature-measuring resistive element for the heating resistive element includes a metal film mainly constituted by at least one from among Mo (molybdenum), α-Ta (alpha tantalum), Ti (titanium), W (tungsten), Co (cobalt), Ni (nickel), Fe (iron), Nb (niobium), Hf (hafnium), Cr (chromium), Zr (zirconium), Pt (platinum) and β-Ta (beta tantalum), or a metal nitride compound such as TiN (titanium nitride), TaN (tantalum nitride), MoN (molybdenum nitride), and WN (tungsten nitride), or at least a metal silicide compound from among WSi (tungsten silicide), MoSi (molybdenum silicide), CoSi (cobalt silicide) and NiSi (nickel silicide).

According to the present invention, the heater temperature sensor disposed on the heater can be disposed at a position very close to the heater, and in addition materials suitable for a heater and a sensor can be used and because of its high sensibility and reliability for a long period of time, further improvements in its economy can be achieved.

DETAILED DESCRIPTION OF THE PREFERRED EMBODIMENTS

We will describe below the embodiments of the present invention with reference to drawings.

First Embodiment

Figure 1:
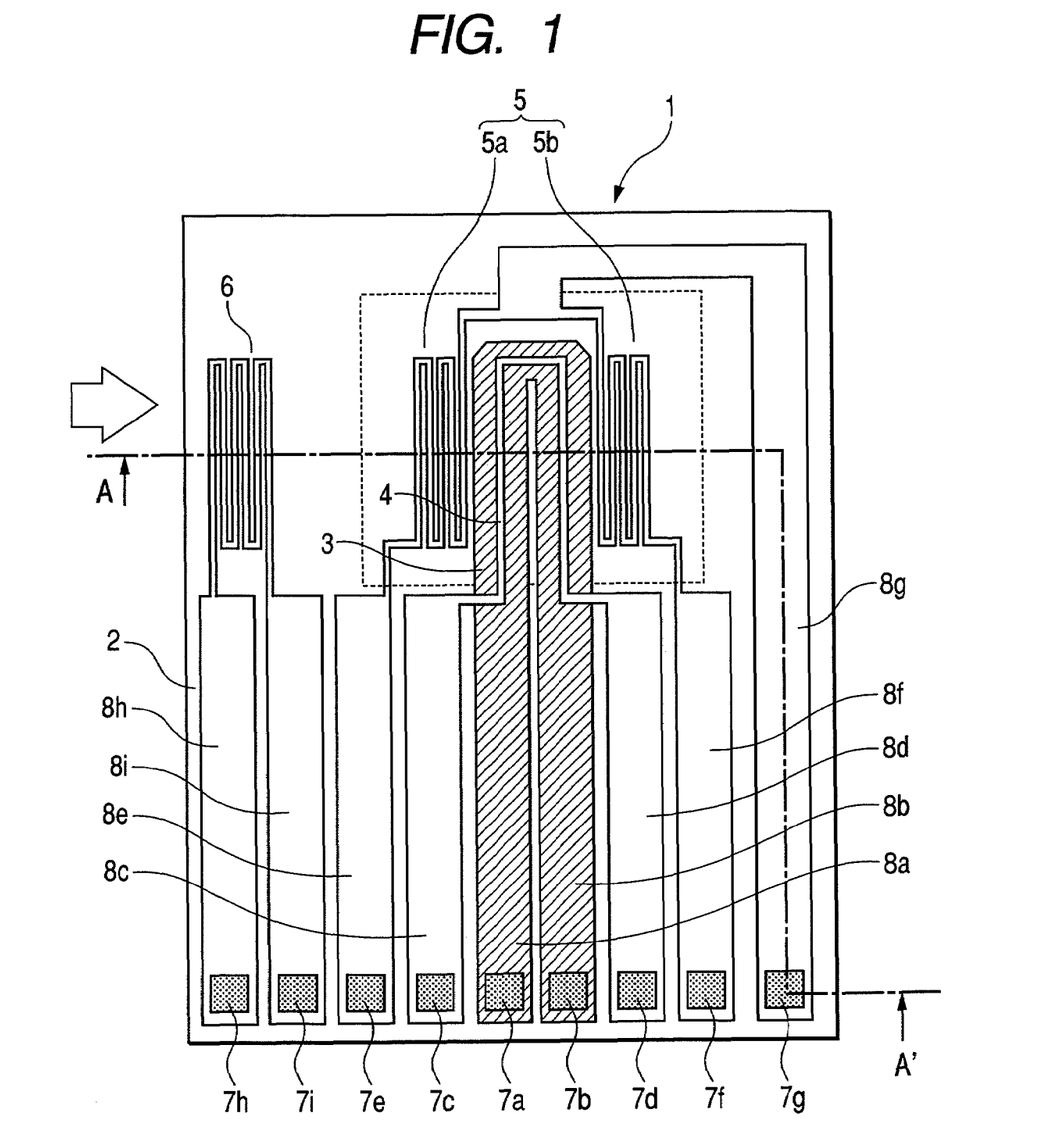
FIG. 1 is a top plan view of the essential part showing an example of the thermal-type fluid flow sensor according to the first embodiment of the present invention.

FIG. 1 shows an example of a top plan view of the essential part of thermal-type fluid flow sensor according to the first embodiment of the present invention.

The measuring element 1 which is a thermal-type fluid flow sensor includes a semiconductor substrate 2 made of a single crystal Si, a heating resistive element 3 formed on the semiconductor substrate 2 through an insulating film, temperature-measuring resistive elements 4 for a heating resistive element for detecting the temperature of the heating resistive element 3, temperature-measuring resistive elements 5 constituted by the upstream temperature-measuring resistive element 5a and the downstream temperature-measuring resistive element 5b for detecting the temperature of the air heated by the heating resistive element 3, an air temperature-measuring resistive element 6 for measuring the temperature of air, terminal electrodes 7a, 7b, 7c, 7d, 7e, 7f, 7g, 7h, and 7i for connecting the signal of the temperature-measuring element with the outside circuits, extracting wirings 8a and 8b, for connecting both ends of the temperature-measuring resistive elements 4 for the heating resistive with the terminal electrodes 7a and 7b, extracting wirings 8c, 8d for connecting both ends of the temperature-measuring resistive elements 4 for the heating resistive element with the terminal electrodes 74, 7f, extracting wirings 8e, 8f for connecting both ends of the temperature-measuring resistive elements 5 with the terminal electrodes 7e, 7, an extracting wiring 8g for connecting a point between the upstream temperature-measuring resistive element 5a and the downstream temperature-measuring resistive element 5b with a terminal electrode 7g, and extracting electrode 8g for connecting a point between the upstream temperature-measuring resistive element 5a and the downstream temperature-measuring resistive element 5b with a terminal electrode 7g, and extracting wirings 8h and 8i for connecting both ends of the air temperature-measuring resistive elements with terminal electrodes 7h and 7i.

The heating resistive element 3 is for example approximately 10-150 μm wide, the temperature-measuring resistive 4 for the heating resistive element is for example approximately 0.5-100 μm wide, and the temperature-measuring resistive element 5 and the air temperature-measuring resistive element 6 is for example approximately 0.5-20 μm wide. And the extracting wiring 8a, 8b, 8c, 8d, 8e, 8f, 8g, 8h, 8i are for example approximately 30-500 μm wide. Incidentally, it is better to use heating resistive elements 3 with a wider wiring width than that of the temperature-measuring resistive element 4 for the heating resistive element to secure the energy for heating air.

We will then describe an example of the manufacturing method of a thermal-type fluid flow sensor according to this first embodiment according to the order of process with reference to FIG. 2A-FIG. 2G. FIG. 2A-FIG. 2G are sectional views of the essential part along the A-A" line of FIG. 1.

Figure 2A:
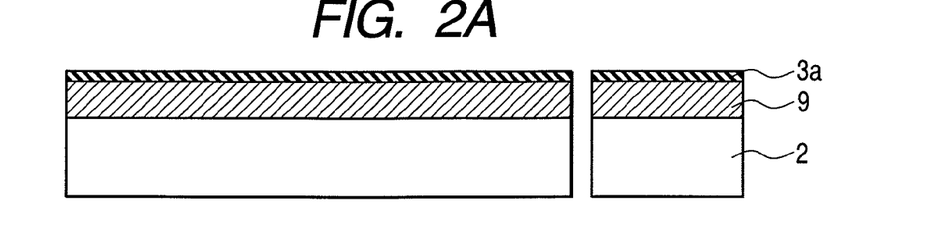
FIG. 2A is a sectional view of the essential part showing manufacturing process (1) of the thermal-type fluid flow sensor according to the first embodiment of the present invention.

To begin with, as shown in FIG. 2A, a single-crystal Si semiconductor substrate 2 should be prepared. Then, an insulating layer 9 and a first metal film 3a are formed one after another on the semiconductor substrate 2. The insulating film 9 is provided to insulate the semiconductor substrate 2 and the metal film 3a, and is constituted for example by SiOx (silicon oxide) film or SiN (silicon nitride), and is approximately 200 nm-1,000 nm. The first metal film 3a is a WSi (tungsten silicide) film approximately 500 nm thick formed by the sputtering process. The temperature of the semiconductor substrate 2 at the time of forming the first metal film 3a by the sputtering method is maintained for example approximately 200° C.-500° C.

Figure 2B:
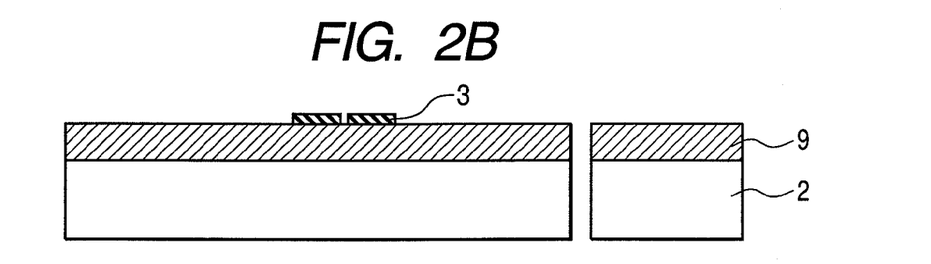
FIG. 2B is a sectional view of the essential part showing manufacturing process (2) of the thermal-type fluid flow sensor according to the first embodiment of the present invention.

Then, as shown in FIG. 2B, the metal film 3a is etched by using the resist pattern formed by the photo lithography method as a mask to form the heating resistive element 3 and the extracting wiring 8a, 8b made of the first metal film 3a.

Figure 2C:
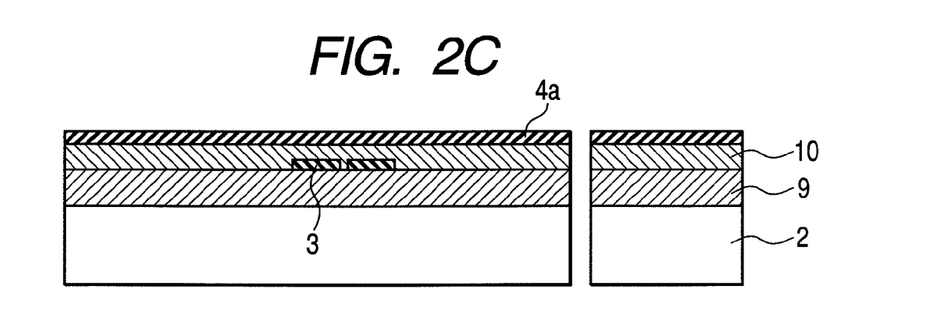
FIG. 2C is a sectional view of the essential part showing manufacturing process (3) of the thermal-type fluid flow sensor according to the first embodiment of the present invention.

Then, as shown in FIG. 2C, the insulating film 10 and the metal film 4a are formed successively on the heating resistive element 3. The insulating film 10 is provided to isolate the first metal film 3 and the second metal film 4a, is made of for example a SiOx (silicon oxide) film or a SiN (silicon nitride) film and is approximately 20-500 nm thick. Incidentally, the thinner the insulating film 10 is, the more precisely temperature can be measured because of a greater proximity to the heating resistive element 3. However, the temperature-measuring resistive elements 4 for the heating resistive element are always heated and therefore changes in insulating due to thermal deterioration are feared. For this reason, it is preferable to keep the same within the limit of film thickness. In addition, the film thickness of the insulating film 10 is determined by taking into consideration the material and the precision of processing of the second metal film. With regard to the second metal film 4a, the case of a Mo (molybdenum) film approximately 150 nm thick formed by the sputtering method can be shown as an example. The temperature of the semiconductor substrate 2 at the time of forming the second metal film 4a by the sputtering method is maintained for example at approximately 200° C.-500° C. Incidentally, after the second metal film 4a is formed, it is thermally processed at 800° C. or more, preferably at 1,000° C. This thermal processing reduces resistance ratio and temperature co-efficiency of resistance, (abbreviated hereinafter to as TCR) improves. And this thermal processing may be carried out after the formation of the second metal film 4a, after the resist patterning or after the formation of the insulating film 11.

Figure 2D:
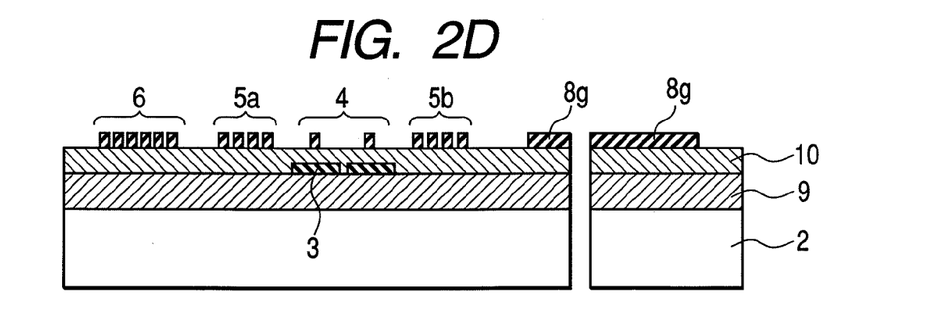
FIG. 2D is a sectional view of the essential part showing manufacturing process (4) of the thermal-type fluid flow sensor according to the first embodiment of the present invention.

Then as shown in FIG. 2D, the second metal film 4a is etched by using the resist pattern formed by the photo lithography as a mask to form the temperature-measuring resistive element 4 for the heating resistive element made of the second metal film 4a, the temperature-measuring resistive element 5 (the upstream temperature-measuring resistive element 5a and the downstream temperature-measuring resistive element 5b), the air temperature-measuring resistive element 6 and the extracting wiring 8g.

Incidentally, FIG. 2D and FIG. 2E-FIG. 2G used in the following description show only the extracting wiring 8g and omit other extracting wirings 8c, 8d, 8e, 8f, 8h and 8i. However, these extracting wirings 8c, 8d, 8e, 8f, 8h and 8i are formed at the same time as the extracting wiring 8g.

Figure 2E:
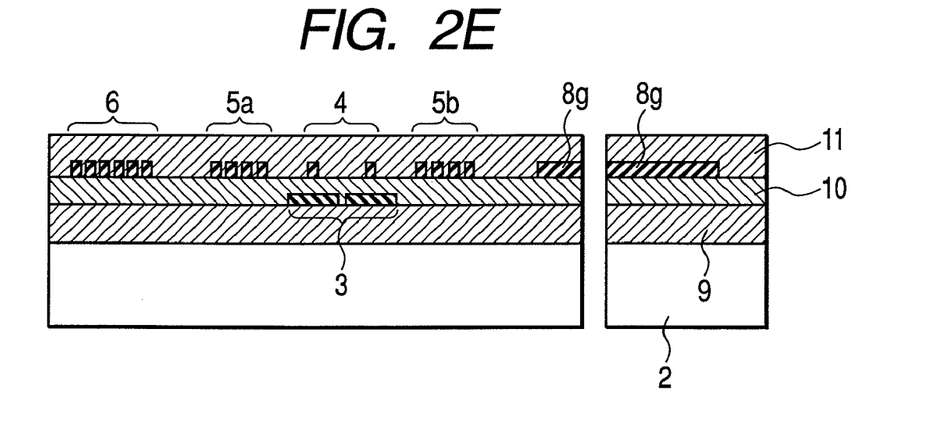
FIG. 2E is a sectional view of the essential part showing manufacturing process (5) of the thermal-type fluid flow sensor according to the first embodiment of the present invention.

Then as shown in FIG. 2E, an insulating film 11 is formed in the upper layer of the temperature-measuring resistive element 4 for the heating resistive element, the temperature-measuring resistive element 5 (the upstream temperature-measuring resistive element 5a and the downstream temperature-measuring 5b), the air temperature-measuring resistive element 6 and the extracting wiring 8g. The insulating film 11 is made up by for example a SiOx (silicon oxide) film or a SiN (silicone nitride) and is approximately 200 nm-500 nm.

Figure 2F:
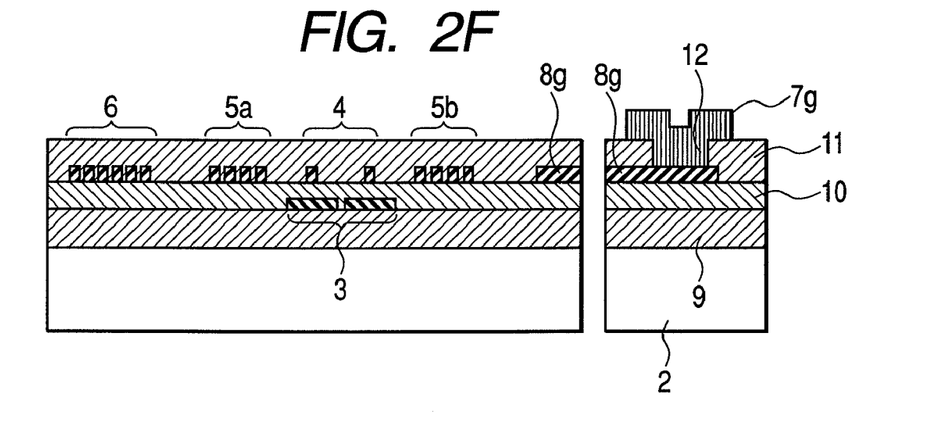
FIG. 2F is a sectional view of the essential part showing manufacturing process (6) of the thermal-type fluid flow sensor according to the first embodiment of the present invention.

Then as shown in FIG. 2F, the insulating film 11 is etched by using the resist pattern formed by the photo lithography as a mask to form a connecting hole 12 for exposing a part of the extracting wiring 8g made of the second metal film 4a. And although not shown, the insulating film 11 and the insulating film 10 are etched by using a resist pattern as a mask on the extracting wiring 8a, 8b made of the first metal film 3a to form connecting holes 12 at the same time for exposing a part thereof. For the etching mentioned above, either the dry etching method or the wet etching method is used.

Then a third metal film 7 is formed in the upper layer of the insulating film 11 including the interior of the connecting hole 12. Then, the third metal film is etched by using the resist pattern formed by the photo lithography process as a mask to form a terminal electrode 7g for electrically connecting with the extracting wiring 8g through the connecting hole 12. Incidentally, FIG. 2G used in the following description and FIG. 2F shows only the terminal electrode 7g and omits other terminal electrodes 7a, 7b, 7c, 7d, 7e, 7f, 7h and 7i. However, these terminal electrodes 7a, 7b, 7c, 7d, 7e, 7f, 7h and 7i are formed at the same time as the terminal electrode 7g.

Figure 2G:
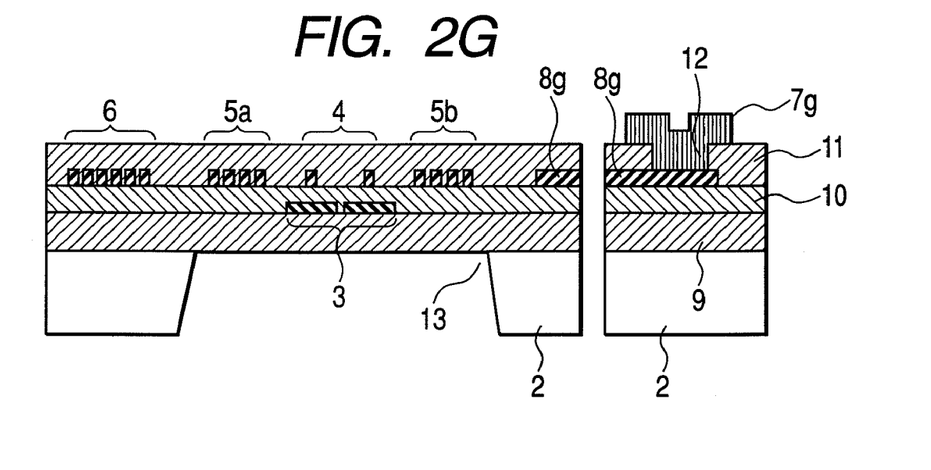
FIG. 2G is a sectional view of the essential part showing manufacturing process (7) of the thermal-type fluid flow sensor according to the first embodiment of the present invention.

The third metal film 7 is constituted for example by an Al (aluminum) alloy film approximately 1 μm thick. However, in order to improve the contact with the extracting wiring 8 constituted by the first metal film 3a and the second metal film 4a, before the formation of the same, the surface of the first metal film 3a and the second metal film 4a may be spatter etched with Ar (argon). Furthermore, in order to ensure its contact, the third metal film may be formed by a film stack constituted by a barrier film such as TiN (titanium nitride) and an Al alloy film. Incidentally, if the barrier metal film is formed relatively thick at this time, the contact resistance increases. Therefore, it is preferable to choose a thickness of approximately 20 nm. However, if a sufficient area of contact is secured and the problem of increase in resistance can be avoided, it is possible to reduce the thickness of the barrier metal film to 100 nm or less.

Then, as shown in FIG. 2G, a resist pattern is formed by the photo lithography method on the back of the semiconductor substrate 2, and the resist pattern is used as a mask to wet etch a part of the semiconductor substrate 2 using KOH (potassium hydrate) solution to form a diaphragm 13. This diaphragm 13 is formed at positions including the area where the heating resistive element 3, the temperature-measuring resistive elements 4 for the heating resistive element and the temperature-measuring resistive elements 5 (the upstream temperature-measuring resistive element 5a and the downstream temperature-measuring resistive element 5b) are formed.

In the preceding embodiment, we described the first metal film of the heating resistive element and the like in connection with the thermal-type fluid flow sensor constituted by WSi or TiN. However, because of the necessity to generate much calorie for the material of the heating resistive element, it is effective to expand the wiring width. As a result, materials having a resistance ratio of 100 μm·cm or more, for example, a metal nitride compound such as TaN (tantalum nitride), MoN (molybdenum nitride), WN (tungsten nitride) and the like, and at least a metal silicide compound such as MoSi (molybdenum silicide), CoSi (cobalt silicide), NiSi (nickel silicide) and the like, and β-Ta (beta tantalum) and the like are preferable. However, in the case of a film having a low resistance ratio, for example a metal film constituted mainly by at least one from among Mo (molybdenum), α-Ta (alpha tantalum), Ti (titanium), W (tungsten), Co (cobalt), Nh (nickel), Fe (iron), Nb (niobium), Hf (hafnium), Cr (chromium), Zr (zirconium) can be used by adjusting the film thickness and the wiring width.

We have described a thermal-type fluid flow sensor in which the second metal film of the temperature-measuring resistive element and the like is constituted by Mo. However, for example a metal film mainly constituted by at least one from among α-Ta (alpha tantalum), Ti (titanium), W (tungsten), Co (cobalt), Ni (nickel), Fe (iron), Nb (niobium), Hf (hafnium), Cr (chromium) or Zr (zirconium), a metal nitride compound such as TaN (tantalum nitride), MoN (molybdenum nitride), WN (tungsten nitride) and the like, and at least a metal silicide compound from among MoSi (molybdenum silicide), CoSi (cobalt silicide), Nisi (nickel silicide) and the like may be chosen. Thus a material whose resistance to temperature (resistance temperature coefficient) increases markedly, for example material having a resistance temperature coefficient of 2,000 ppm/° C. or more is preferable.

And in the preceding embodiment, different metal films are used for the first metal film and the second metal film. However, the same metal film may be used.

And in this first embodiment, we described a three-layer metal film structure constituted by the first metal film 3a, the second metal film 4a and the third metal film 7. However, if the wiring crosses in the layout of resistive elements and the like, a four-layer metal film structure may be adopted by forming another metal film in which the same material as the first metal film 3a, the second metal film 4a and the third metal film 7 is used.

Figure 3:
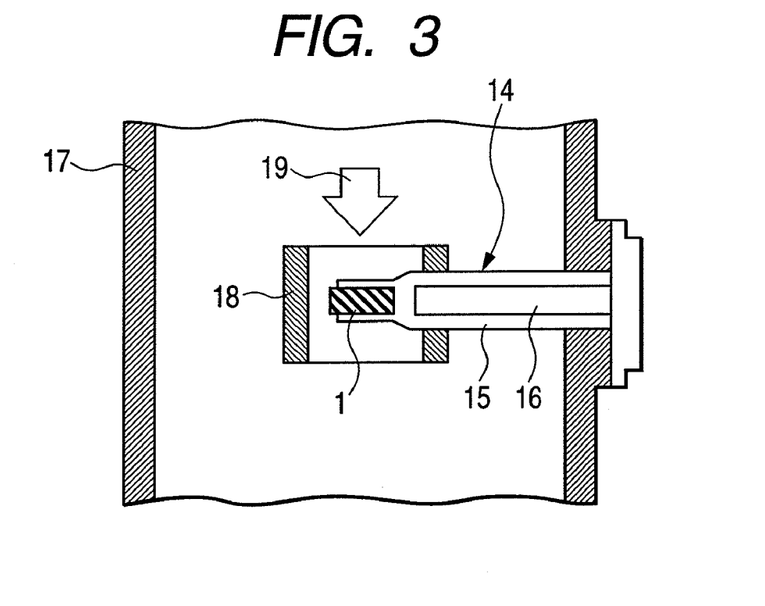
FIG. 3 is a schematic layout drawing of a thermal-type air flow meter in which a thermal-type fluid flow meter fixed to the air intake path of an automobile internal engine is implemented.

FIG. 3 is a schematic illustration of a thermal-type air flowmeter provided with a thermal-type fluid flow sensor fixed in the intake path of an internal engine of automobiles according to the first embodiment of the present invention. The thermal-type air flowmeter 14 includes a measuring element 1 which is a thermal-type fluid flow sensor, a support 15 constituted by the upper part and the lower part, and an external circuit 16. The measuring element 1 is disposed in the subsidiary path 18 which is inside the air path 17. The external circuit 16 is electrically connected with the terminal of the measuring element 1 through the support 15. The intake air flows in the direction of air current shown by the arrow 19 in FIG. 9 or in the reverse direction.

Figure 4:
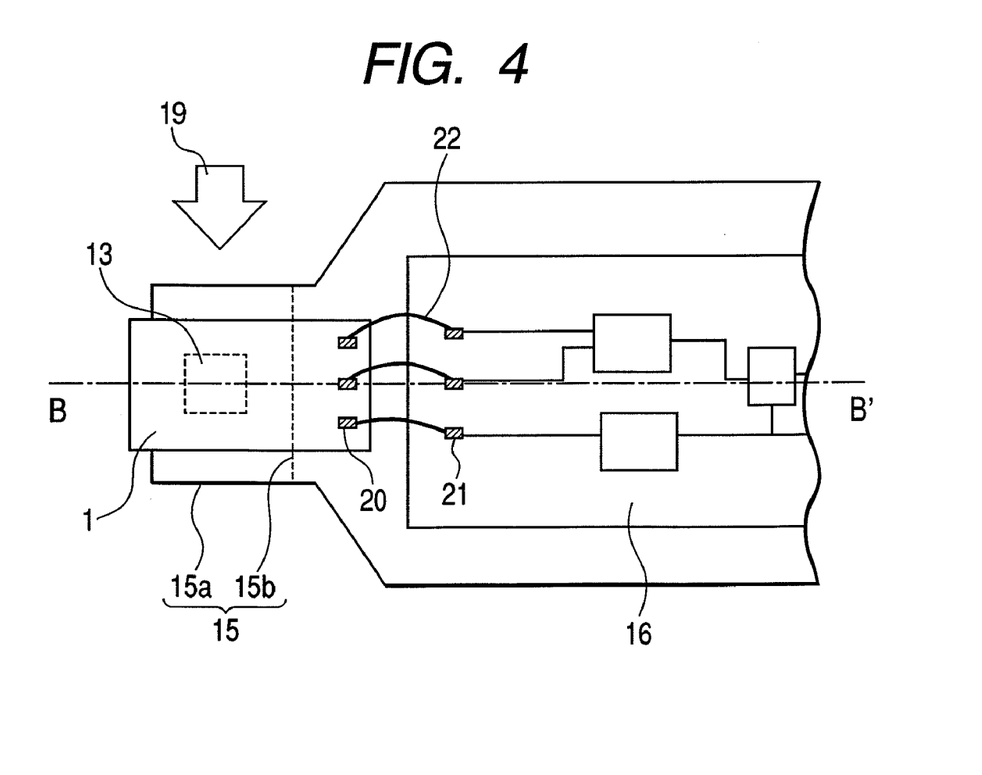
FIG. 4 is a top plan view of the essential part enlarging a part of FIG. 3.

FIG. 4 is a top plan view of the essential part that enlarges a part (measuring element 1 and support 15) of FIG. 3 described above, and FIG. 5 is a sectional view of the essential part cut along the B-B' line in FIG. 4.

Figure 5:
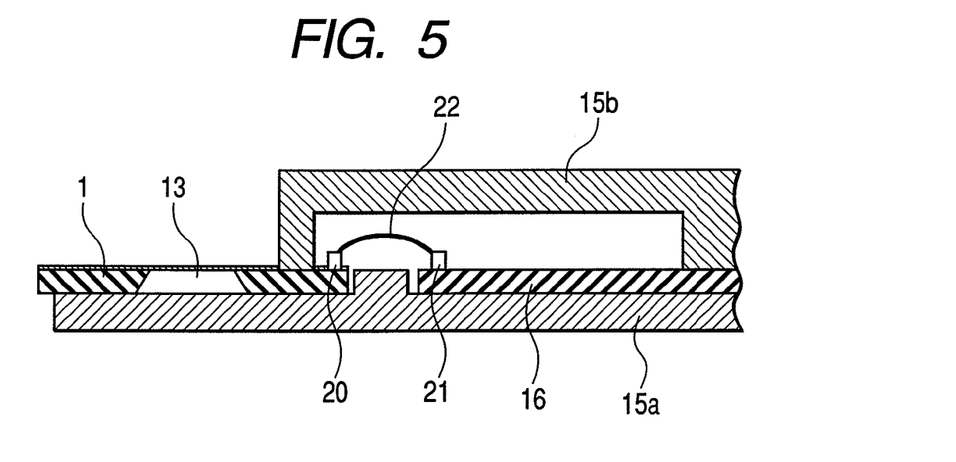
FIG. 5 is a sectional view of the essential part cut along the B-B' line of FIG. 4.

As FIG. 4 and FIG. 5 show, the measuring element 1 is fixed on the lower support 15a, and the terminal electrode 20 of the measuring element 1 and the terminal electrode 21 of the external circuit 16 are electrically connected by the wire bonding method using for example a gold wire 22. The terminal electrodes 20, 21 and the gold wire 22 are protected by the cover of the upper support 15b. The upper support 15b may provide a hermetical cover. Incidentally the code 13 in the figure represents a diaphragm.

Figure 6:
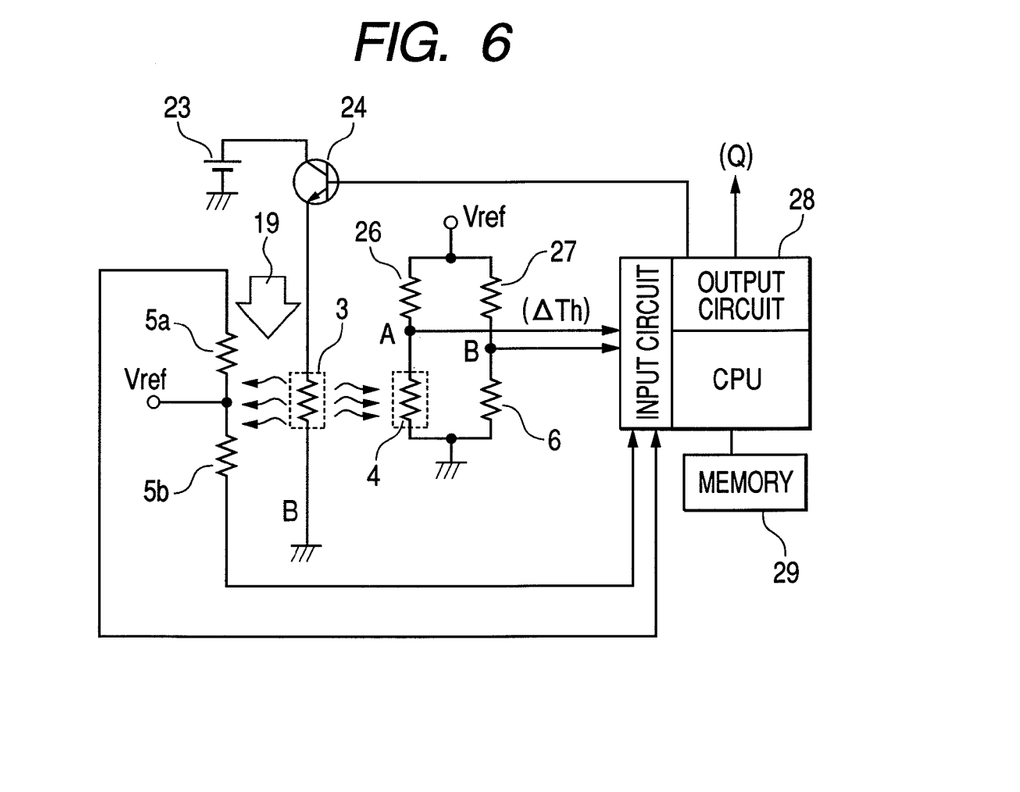
FIG. 6 is a circuit diagram showing an example of operation of the thermal-type fluid flow sensor according to the first embodiment of the present invention.
Figure 12:
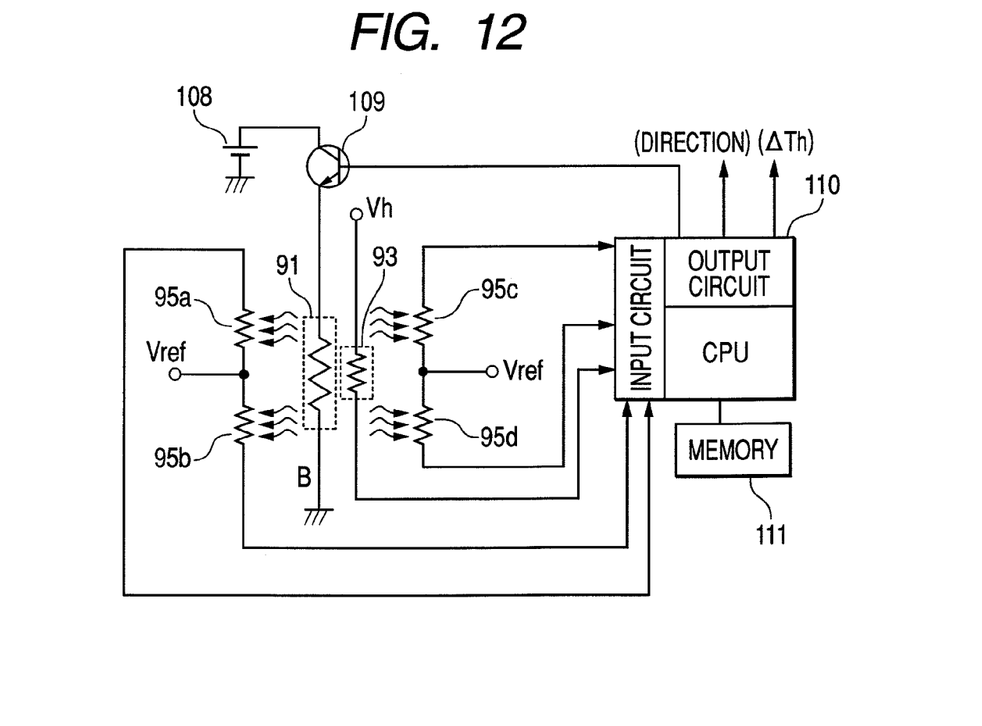
FIG. 12 is a circuit diagram showing an example of operation of the acceleration sensor according to the fifth embodiment of the present invention.

We will now describe the operation of the thermal air flow meter 14 with reference to FIG. 6. FIG. 12 is a circuit diagram showing the measuring element 1 and the external circuit 16 according to this embodiment. The code 23 represents the power source. The code 24 represents a transistor for circulating heated current to the heating resistive element 3. The codes 26, 27 represent resistances fixed in the external circuit 16. The code 28 represents a control circuit including an output circuit that includes an A/D converter and the like and a CPU (the Central Processing Unit) for carrying out computing processing. The code 29 represents a memory circuit. Incidentally, the resistances 26, 27 fixed within the external circuit 16 may be fixed within the measuring element 1.

The voltage coming out from the terminals A, B of a bridge circuit constituted by the temperature-measuring resistive element 4 for the heating resistive element, the air temperature-measuring resistive element 6, the resistances 26, 27 is inputted into the control circuit 28, and the resistance value of the heating resistive element 3, the temperature-measuring resistive element 4 for the heating resistive element, the air temperature-measuring resistive element 6, and the resistances 26, 27 is set in such a way that the temperature of the temperature-measuring resistive element 4 for the heating resistive element indirectly heated by the heating resistive element 3 may be higher by a predetermined value (for example $\Delta Th=100°$ C.) than the temperature of the air temperature-measuring resistive element 6 for the air temperature, and is controlled by the control circuit 28. When the above-mentioned $\Delta Th$ has deviated from the set value, the transistor 24 is controlled by the output of the control circuit 28 and the current of the heating resistive element 3 flows.

On the other hand, the upstream temperature-measuring resistive element 5a and the downstream temperature-measuring resistive element 5b of the temperature-measuring resistive element 5 are set at almost the same resistance value, and the temperature-measuring resistive element 5 remains at a predetermined value due to the indirect heating by the heating resistive element 3. The temperature relationship of the above-mentioned resistive elements will be the resistive element 4 for the heating resistive element>the temperature-measuring resistive element 5>the air temperature-measuring resistive element 4. When the intake air flows in the direction of the air current 19, the temperature of the upstream temperature-measuring resistive element 5a falls down disrupting the balance with the downstream temperature-measuring resistive element 5b. The values of the temperature-measuring resistive element 5a and the temperature-measuring resistive element 5b are inputted in the control circuit 28, computing processing is carried out and the air flow rate (Q) is outputted. Incidentally, when the air current 19 is reversed, the air flow rate changes likewise, and therefore it is possible to detect reverse flow.

Second Embodiment

In this second embodiment, the insulating films included in the measuring element that is a thermal-type fluid flow sensor are put together to constitute a multilayered structure, and the top layer is a protective layer.

Figure 7:
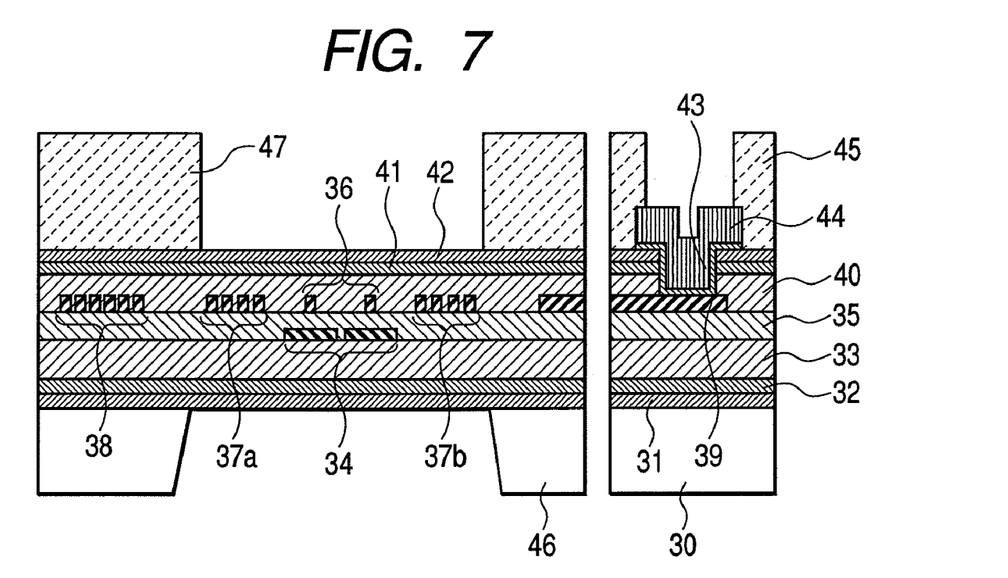
FIG. 7 is a sectional view of the thermal-type fluid flow sensor according to the second embodiment of the present invention.

FIG. 7 shows an example of the thermal-type fluid flow sensor according to the second embodiment of the present invention and is a sectional view of the essential part cut out along the A-A' line of FIG. 1 showing the first embodiment described above. The first insulating film 31 is formed on the semiconductor substrate 30 made of a single crystal Si, and the second insulating film 32 and the third insulating film 33 are formed successively one on the other. The insulating film 31 is for example a $SiO_2$ film formed in a high-temperature furnace and is approximately 200 nm. The insulating film 32 is for example a SiNx film approximately 150-300 nm thick. The insulating film 33 is a SiOx film approximately 500 nm.

Then, the fourth metal film, for example a heating resistive element 34 constituted by WSi like the above-mentioned embodiment is formed, and in the upper layer thereof the fifth layer, for example the temperature-measuring resistive element 36 for the heating resistive element, the temperature-measuring resistive element 37 (the upstream temperature-measuring resistive element 37a and the downstream temperature-measuring resistive element 37b), the air temperature-measuring resistive element 38 and the extracting wiring 39 constituted by a Mo film similar to the first embodiment described above are formed. Incidentally, their adhesion with the insulating film in the lower layer is improved by applying the sputter etching method using Ar gas and the like before forming the fourth metal film and the fifth metal film.

Then, the fifth insulating film 40, the sixth insulating film 41, the seventh insulating film 42 are formed successively in the upper layer of the temperature-measuring resistive element for the heating resistive element 36, the temperature-measuring resistive element 37 (the upstream temperature-measuring resistive element 37a and the downstream temperature-measuring resistive element 37b), the air temperature-measuring resistive element 38 and the extracting wiring 39. The insulating film 40 is for example a SiOx film with a film thickness of approximately 500 nm. The insulating film 41 is for example a SiNx film and is approximately 150-300 nm thick. The insulating film 42 is for example a SiOx film and is approximately 100-500 nm thick.

And like the above-mentioned first embodiment, the terminal electrode 44 is formed by an extracting wiring 39 made of the fifth metal film, and although not shown, a connecting hole 43 for exposing a part of the extracting wirings 8a, 8b of the heating resistive element 34 made of the fourth metal film, and the sixth metal film electrically connected with the extracting wiring 39 through the connecting hole 43. Incidentally, the sixth metal film is formed for example by a film stack constituted by a barrier metal film such as TiN (titanium nitride) and the like approximately 50 nm thick and an Al alloy film approximately 1 μm.

Then, a protection film 45 is formed, and after opening at least the terminal electrode 44 and above the diaphragm by using the photo lithography method, the diaphragm 46 is formed. Incidentally, the protection film used is for example a polyimide film with a film thickness of approximately 2-3 μm. As for other materials, photo sensitive organic films may be used, and the aperture 47 on the diaphragm 46 is narrower than the diaphragm 46.

In this second embodiment, the film thickness of various insulating films and metal films is to be adjusted so that the stress on the diaphragm 46 may be tensile.

Third Embodiment

In this third embodiment, the temperature-measuring resistive element for the heating resistive element, the temperature-measuring resistive element, and the air temperature-measuring resistive element are provided in the lower layer of the heating resistive element included in the measuring element that is a thermal-type fluid flow sensor.

Figure 8:
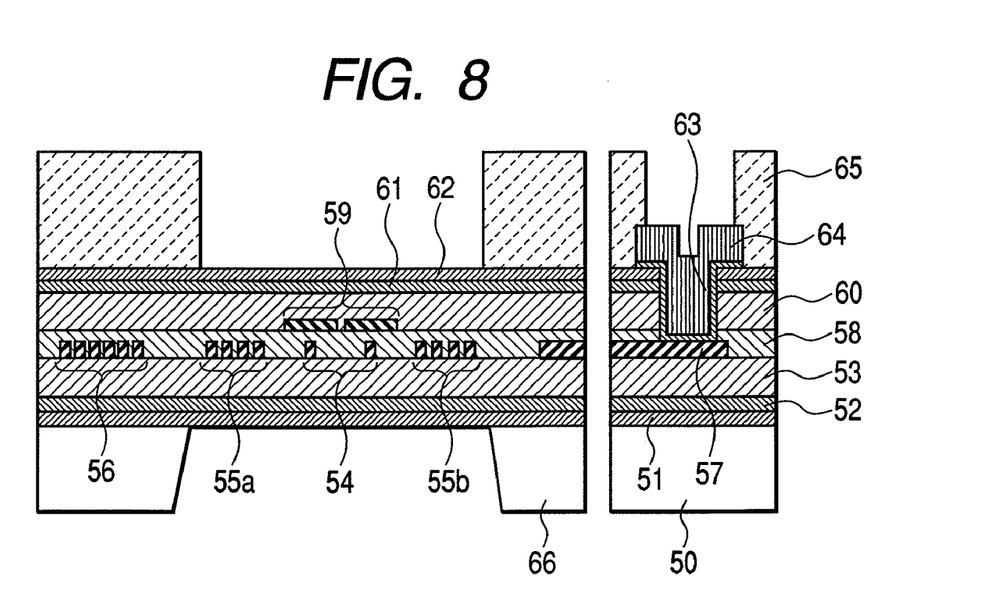
FIG. 8 is a sectional view of the thermal-type fluid flow sensor according to the third embodiment of the present invention.

FIG. 8 shows an example of the thermal-type fluid flow sensor according to this third embodiment, and shows the sectional view of the essential part along the A-A' line in FIG. 1 showing the first embodiment described above. The eighth insulating film 51 is formed on the semiconductor substrate 50 constituted by a single crystal Si, and furthermore the ninth insulating film 52 and the tenth insulating film 53 are formed successively. The insulating film 51 is for example a $SiO_2$ film formed in a high-temperature furnace and is approximately 200 nm thick. The insulating film 52 is for example a SiNx film and it is approximately 150-300 nm thick. The insulating film 53 is a SiOx film and is approximately 500 nm thick.

Then, the temperature-measuring resistive element 54 for the heating resistive element, the temperature-measuring resistive element 55 (the upstream temperature-measuring resistive element 55a and the downstream temperature-measuring resistive element 55b), the air temperature-measuring resistive element 56 and the extracting wiring 57 constituted by the seventh metal film, for example a Mo film are formed. In the upper layer of the same, the heating resistive element 59 constituted by the eighth metal film, for example WSi is formed through the $11^{th}$ insulating film 58. Incidentally, before forming the seventh metal film and the eighth metal film, the adhesion with the insulating film in the lower layer is improved by means of the sputter etching method using Ar gas.

Then the $12^{th}$ insulating film 60, the $13^{th}$ insulating film 61, the $14^{th}$ insulating film 62 and so forth are successively formed in the upper layer of the heating resistive element 59. The insulating film 60 is for example a SiOx film with a film thickness of approximately 500 nm. The insulating film 61 is for example a SiNx film and is approximately 150-300 nm. The insulating film 62 is for example a SiOx film and is approximately 100-500 nm.

And like the above-mentioned first embodiment, the terminal electrode 64 is formed by an extracting wiring 57 made of the seventh metal film, and although not shown, a connecting hole 63 for exposing a part of the extracting wirings 8a, 8b of the heating resistive element 59 made of the eighth metal film, and the ninth metal film electrically connected with the extracting wiring 57 through the connecting hole 63. Incidentally, the ninth metal film is formed for example by a film stack made of a barrier metal film such as TiN (titanium nitride) and the like approximately 50 nm thick and an Al alloy approximately 1 μm.

Then, a protection film 65 is formed, and after opening the terminal electrode 64 and above the diaphragm 66, the diaphragm 66 is formed. Incidentally, the protection film 45 is for example a polyimide film with a film thickness of approximately 2-3 μm.

According to this third embodiment, even if the material used in the eighth metal film is a material whose properties change radically due to thermal treatment, it is possible to obtain the equivalent results as the first embodiment by forming in the beginning the temperature-measuring resistive elements 54 for the heating resistive element, the temperature-measuring resistive element 55 (the upstream temperature-measuring resistive element 55a and the downstream temperature-measuring resistive element 55b) and the air temperature-measuring resistive element 56, and proceeding to their thermal processing before forming the eighth metal film. And since there is nothing but an insulating layer on the heating resistive element 59, the loss of calorie for heating air is very limited.

Fourth Embodiment

In this fourth embodiment, a multilayered film of TiN and Mo is used for the temperature-measuring resistive elements for the heating resistive element included in the measuring element that is a thermal-type fluid flow sensor, the temperature-measuring resistive element and the air temperature-measuring resistive element.

Figure 9:
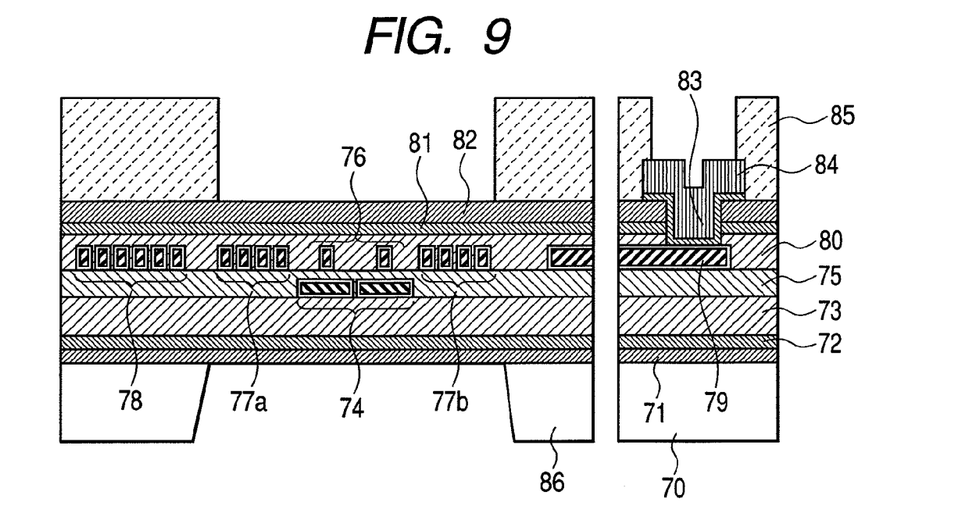
FIG. 9 is a sectional view of the thermal-type fluid flow sensor according to the fourth embodiment of the present invention.

FIG. 9 shows an example of the thermal-type fluid flow sensor according to this fourth embodiment, and shows the sectional view of the essential part along the A-A' line in FIG. 1 showing the first embodiment described above. The $15^{th}$ insulating film 71 is formed on the semiconductor substrate 70 constituted by a single crystal Si, and furthermore the $16^{th}$ insulating film 72 and the $17^{th}$ insulating film 73 are formed successively. The insulating film 71 is for example a $SiO_2$ film formed in a high-temperature furnace and is approximately 200 nm thick. The insulating film 72 is for example a SiNx film and it is approximately 150-300 nm thick. The insulating film 73 is a SiOx film and is approximately 500 nm thick.

Then, as the tenth metal film, a TiN film 20 nm and a WSi film 500 nm are continuously formed and after being processed into the form of a thermal-type resistive element by the photo lithography, the TiN film 20 nm is formed again. Then they are processed by the photo lithography process in a dimension larger than the heater pattern described above to form a heating resistive element 74 made of WSi covered by a TiN film.

As the $11^{th}$ metal film through the $18^{th}$ insulating film 75 in the upper layer thereof, a TiN film 20 nm and a Mo film 150 nm are continuously formed, and after their processing by the photo lithography method into the form of the temperature-measuring resistive elements for the heating resistive element, the temperature-measuring resistive element (the upstream temperature-measuring resistive element and the downstream temperature-measuring resistive element), the air temperature-measuring resistive element and the extracting wiring, a TiN film 20 nm is formed once again, and after a processing into a dimension larger than the temperature-measuring resistive elements for the heating resistive element, the temperature-measuring resistive element (the upstream temperature-measuring resistive element and the downstream temperature-measuring resistive element), the air temperature-measuring resistive element and the extracting wiring, the temperature-measuring resistive elements 76 for the heating resistive element, the temperature-measuring resistive element 77 (the upstream temperature-measuring resistive element 77a and the downstream temperature-measuring resistive element 77b), the air temperature-measuring resistive element 78 and the extracting wiring 79 covered with a TiN film are formed.

Incidentally, the adhesion with the insulating film in the lower layer is improved by the sputter etching method using Ar gas and the like before forming the tenth metal film and the 11th metal film.

Then, the 19th insulating film 80, the 20th insulating film 81 and the 21st insulating film 82 are successively formed in the upper layer of the temperature-measuring resistive elements 76 for the heating resistive element, the temperature-measuring resistive element 77 (the upstream temperature-measuring resistive element 77a and the downstream temperature-measuring resistive element 77b), the air temperature-measuring resistive element 78 and the extracting wiring 79. The insulating film 80 is for example a SiOx film and is approximately 500 nm thick. The insulating film 81 is for example a SiNx film and it is approximately 150-300 nm thick. The insulating film 82 is a SiOx film and is approximately 100-500 nm thick.

And like the above-mentioned first embodiment, the terminal electrode 84 is formed by an extracting wiring 79 made of the 11th metal film, and although not shown, a connecting hole 83 for exposing a part of the extracting wirings 8a, 8b of the heating resistive element made of the tenth metal film, and the 12th metal film electrically connected with the extracting wiring 79 through the connecting hole 83. Incidentally, the 12th metal film is formed for example by a film stack made of a barrier metal film such as TiN (titanium nitride) and the like approximately 50 nm thick and an Al alloy approximately 1 µm.

Then, a protection film 85 is formed, and after opening at least the terminal electrode 84 and above the diaphragm by using the photo lithography method, the diaphragm 86 is formed. Incidentally, the protection film 85 is for example a polyimide film with a film thickness of approximately 2-3 µm.

In this fourth embodiment, it is possible to contain the deterioration of the temperature-measuring resistive elements 76 for the heating resistive element, and the temperature-measuring resistive element 77 (the upstream temperature-measuring resistive element 77a and the downstream temperature-measuring resistive element 77b), to make it difficult for any deterioration to occur over time and to maintain high sensibility for a long period of time by adopting the structure of the temperature-measuring resistive elements 76 for the heating resistive element, and the temperature-measuring resistive element 77 (the upstream temperature-measuring resistive element 77a and the downstream temperature-measuring resistive element 77b) covering Mo with TiN so that the heating resistive element 74 may heat up.

Incidentally, in this fourth embodiment, we disclosed a structure of covering both the tenth metal film and the 11th metal film with a TiN film. However, it is possible to obtain a similar effect by adopting the structure of covering any one of the tenth metal film or the 11th metal film with a TiN film.

We observed the effect in the tenth metal film by the adoption of a structure in which the whole WSi film is not covered with a TiN film, for example in the case of the TiN film/WSi film/TiN film structure in which the WSi side wall is in contact with an insulating film, or in the structure in which the TiN film is formed only on or under the WSi film. Also we observed the effect on the 11th metal film, like the case mentioned above, in the case of the TiN film/Mo film/TiN film structure in which Mo of the side wall is in contact with an insulating film, or the structure in which a TiN film is formed only on or under a Mo film.

Fifth Embodiment

In this fifth embodiment, we will describe an example of applying a measuring element including a heating resistive element, a temperature-measuring resistive element for a heating resistive element, and a temperature-measuring resistive element to an acceleration sensor.

Figure 10:
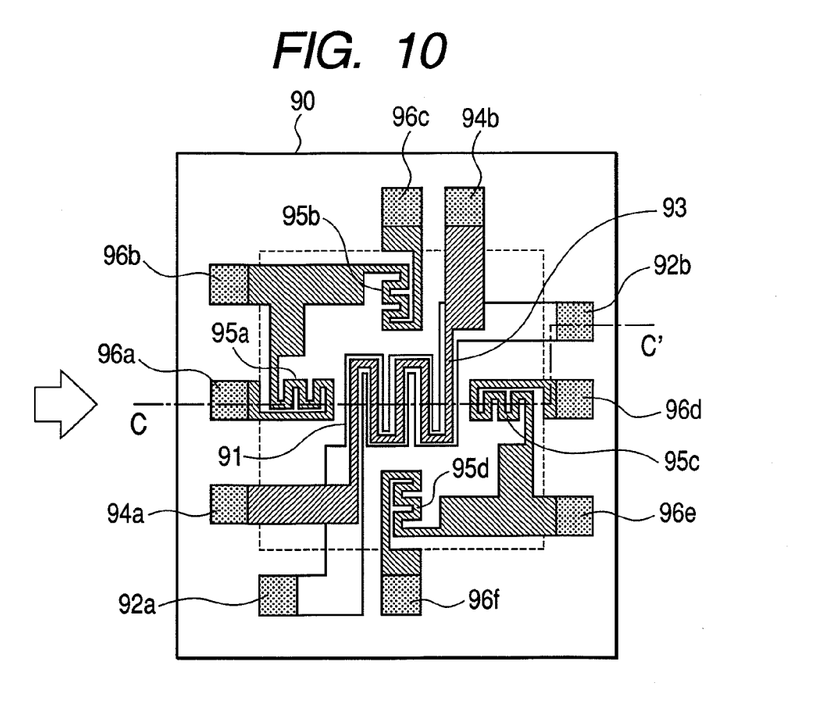
FIG. 10 is a top plan view of an example of the acceleration sensor according to the fifth embodiment of the present invention.

FIG. 10 is a top plan view of the essential part showing an example of the acceleration sensor according to this fifth embodiment.

The acceleration sensor 90 includes a heating resistive element 91 formed on the semiconductor substrate made of a single crystal Si through an insulating film, terminal electrodes 42a, 42b for electrically connecting the heating resistive element 91 and external circuits, a temperature-measuring resistive element 93 for a heating resistive element disposed on the heating resistive element 91, terminal electrodes 94a, 94b for electrically connecting the temperature-measuring resistive elements 93 for the heating resistive element with external circuits, temperature-measuring resistive elements 95a, 95b, 95c, and 95d of the same length (same resistance value) disposed in four directions with a predetermined interval from the heating resistive element 91, and terminal electrodes 96a, 96b, 96c, 96d, 96e, and 96f for electrically connecting the temperature-measuring resistive elements 95a, 95b, 95c and 95d with external circuits, and constitutes a bridge circuit and the like with external circuits.

Figure 11:
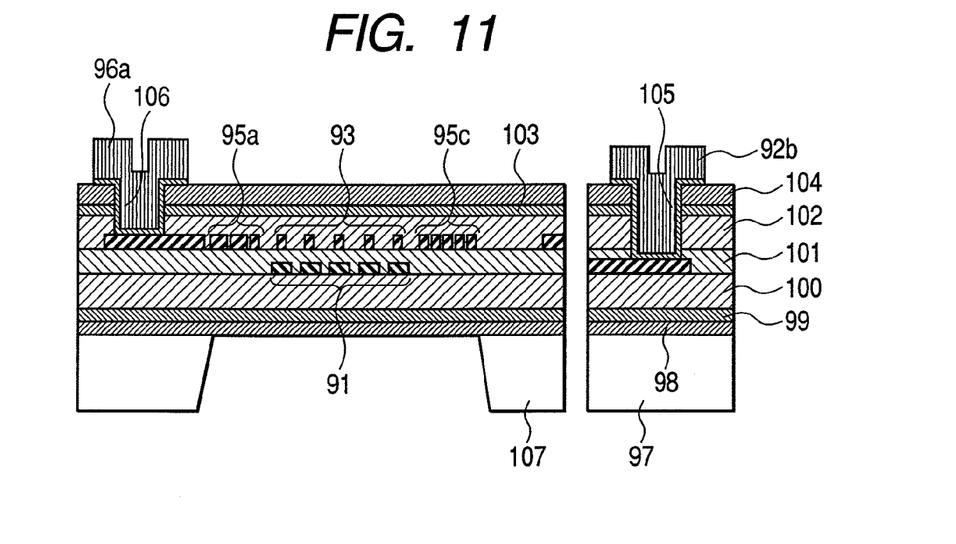
FIG. 11 is a sectional view of the essential part of the acceleration sensor according to the fifth embodiment of the present invention.

FIG. 11 is a sectional view of the essential part cut along the C-C' line of FIG. 10.

Insulating films 98, 99, 100 are formed on the semiconductor substrate 97 constituted by a single crystal Si, and the heating resistive element 91 and the extracting wiring 108b constituted by the 13th metal film are formed on the insulating film 100. The insulating film 98 is for example a SiO2 film formed in a high-temperature furnace and is approximately 200 nm thick. The insulating film 99 is for example a SiNx film and is approximately 150-300 nm thick. The insulating film 100 is a SiOx film and is approximately 500 nm thick. The 13th metal film is similar to the first metal film 3a of the first embodiment described above, and can be exemplified by a WSi film approximately 500 nm thick.

On the heating resistive element 91, insulating films 101 constituted by for example SiOx films or SiNx films approximately 20-200 nm thick are formed.

Then, the temperature-measuring resistive elements 93 for the heating resistive element, the temperature-measuring resistive element 95a, 95c and the extracting wiring 109a constituted by the 14th metal film are formed. The 14th metal film is similar to the first metal film 4a of the first embodiment, and can be exemplified by a Mo film approximately 150 nm thick.

The insulating films 102, 103, 104 are successively formed in the upper layer of the temperature-measuring resistive elements 93 for the heating resistive element, the temperature-measuring resistive element 95a, 5c and the extracting wiring 109a. The insulating film 102 is for example a SiOx film and is approximately 500 nm thick. The insulating film 103 is for example a SiNx film and is approximately 150-300 nm thick. The insulating film 104 is a SiOx film and is approximately 100-500 nm thick. And like the first embodiment described above, the connecting holes 105 and 106 for exposing a part of the extracting wire 108b constituted by the 13th metal wire and the extracting wire 109a constituted by the 14th metal wire, the terminal electrode 92b, 96a connected with the extracting wiring 108b, 109a through the connecting holes 105 and 106, and the diaphragm 107 are formed.

Incidentally, although FIG. 11 shows only the temperature-measuring resistive elements 95a, 95c and omits other temperature-measuring resistive elements 95b, 95d, these temperature-measuring resistive elements 95a, 95b, 95c and 95d are formed at the same time. In addition, although FIG. 17 shows only the terminal electrodes 92b, 96a and omits other terminal electrodes 92a, 94a, 94b, 96b, 96c, 96d, 96e, and 96f, these terminal electrodes are formed at the same time.

We will then describe the operation of an acceleration sensor with reference to FIG. 12 and FIG. 10 described above. FIG. 12 is a circuit diagram showing the acceleration sensor according to this fifth embodiment and external circuits.

To begin with, the heating current is circulated from the external power source 110 to the heating resistive element 91 for indirectly heating. This indirect heating warms the temperature-measuring resistive elements 93 for the heating resistive element and various temperature-measuring resistive elements 95a, 95b, 95c, 95d and causes their resistance value to change. The circulation of the heating current at this time in such a way that the resistance value of the temperature-measuring resistive elements 93 for the heating resistive element may be kept almost at a constant level causes the temperature of the temperature-measuring resistive elements 95a, 95b, 95c, and 95d to stabilize and causes their resistance value to stabilize also. And since the distance from the heating resistive element 91 to each of the temperature-measuring resistive elements is constant, the temperature of these temperature-measuring resistive elements 95a, 95b, 95c and 95d is equalized, their form is rendered uniform and their resistance value also becomes uniform.

When, as shown in FIG. 10, the acceleration sensor 90 moves due to the application of outside force thereon in this state, the indirectly heated state that has been kept in equilibrium is disrupted, and a difference in temperature develops between the temperature-measuring resistive element 95a and the temperature-measuring resistive element 95c causing their resistance value to change and it becomes possible to detect acceleration. This difference in resistance value (difference in voltage) is transmitted to an outside input circuit, is compared with the data in static state stored in the memory 111, the direction of movement and the difference in temperature (ΔTh) are computed by a CPU and the like and are outputted outside. By the output of the acceleration sensor, it will be possible to make various operations such as the adjustment of acceleration, switching ON and OFF and the like.

Incidentally, in this fifth embodiment, we described an acceleration sensor 90 in which the temperature-measuring resistive elements 95a, 95b, 95c, and 95d are arranged in four directions. However, it will be possible to find out more precisely the direction of application of force by changing the angle of and increasing the temperature-measuring resistive elements.

Thus, according to this fifth embodiment, it is possible to apply the present invention not only to the thermal-type fluid flow sensor but also to the acceleration sensor and a highly sensitive acceleration sensor can be realized.

We have described above in specific terms the invention made by the inventors based on the embodiments. However, it is needless to say that the present invention is not limited to the embodiments described above, and can be varied in many different ways to such an extent that does not deviate from its principle.

For example, in the preceding embodiment, we described the first metal film of the heating resistive element and the like with reference to the thermal-type fluid flow sensor made with WSi or TiN. However, we can use a metal film made mainly with at least one from among for example Mo (molybdenum), Ta (tantalum), Ti (titanium), W (tungsten), Co (cobalt), Ni (nickel), Fe (iron), Nb (niobium), Hf (hafnium), Cr (chromium) and Zr (zirconium), or at least a metal nitride compound from among TaN (tantalum nitride), MoN (molybdenum nitride), WN (tungsten nitride) and the like, or at least a metal silicide from among MoSi (molybdenum silicide), CoSi (cobalt silicide), NiSi (nickel silicide) and the like.

We described the thermal-type fluid flow sensor in which the second metal film of the temperature-measuring resistive element is constituted by Mo. However, we can use a metal film mainly constituted by at least one among from for example Ta (tantalum), Ti (titanium), W (tungsten), Co (cobalt), Ni (nickel), Fe (iron), Nb (niobium), Hf (hafnium), Cr (chromium), and Zr (zirconium), or a metal nitride compound such as TaN (tantalum nitride), MoN (molybdenum nitride), WN (tungsten nitride) and the like, and at least a metal silicide compound from among MoSi (molybdenum silicide), CoSi (cobalt silicide), NiSi (nickel silicide) and the like.

And in the preceding embodiment, we used different metal films for the first metal film and the second metal film. However, we can use the same metal film.

The present invention can be applied to various sensors such as temperature sensor, humidity sensor, gas sensor and the like in addition to the thermal-type fluid flow sensor or the acceleration sensor according to the embodiment mentioned above.

What is claimed is:

1. A thermal-type fluid flow sensor for measuring an air flow rate flowing through an air intake passage, comprising:
   a heating resistive element formed on a semiconductor substrate through a first insulating layer;
   a temperature-measuring resistive element for measuring a temperature of the heating resistive element;
   upstream and downstream side temperature-measuring resistive elements for detecting the temperature of air on an upstream side and a downstream side of the air heated by the heating resistive element; and
   an air temperature-measuring resistive element for measuring the air before being heated by the heating resistive element,
   wherein at least the temperature-measuring resistive element for the heating resistive element is disposed in an upper layer or a lower layer of the heating resistive element,
   wherein the temperature-measuring resistive elements are disposed in the upper layer or the lower layer of the heating resistive element through a second insulating layer,
   wherein a film thickness of the second insulating layer disposed between the heating resistive element and the temperature-measuring resistive element for the heating resistive element is approximately 20-500 nm.

2. The thermal-type fluid flow sensor according to claim 1, wherein a film thickness of the first insulating layer disposed between the heating resistive element and the substrate is approximately 200-1000 nm.

3. The thermal-type fluid flow sensor according to claim 1, wherein the upstream and downstream side temperature-measuring resistive elements are disposed in the upper layer or the lower layer of the heating resistive element through the second insulating layer.

4. The thermal-type fluid flow sensor according to claim 1, wherein the air temperature measuring resistive element is disposed in the upper layer or the lower layer of the heating resistive through the second insulating layer.

5. The thermal-type fluid flow sensor according to claim 1, wherein the upstream and downstream side temperature-measuring resistive elements are disposed in the same layer as the temperature-measuring resistive element for the heating resistive element, in such a way that they sandwich the temperature-measuring resistive element for thermal resistive element.

6. The thermal-type fluid flow sensor according to claim 1, wherein the temperature-measuring resistive element for heating resistive element, the upstream and downstream side temperature measuring resistive elements on the upstream side and the downstream side, and the air temperature measuring resistive element are in the same layer, being disposed in the upper layer or lower layer of the heating resistive element.

7. The thermal-type fluid flow sensor according to claim 6, further comprising a third insulating layer disposed in the upper layer of the temperature-measuring resistive element for the heating resistive element, the upstream and downstream side temperature measuring elements and the air temperature measuring resistive element.

8. The thermal-type fluid flow sensor according to claim 7, wherein the third insulating layer is constituted by a multi-layered insulating layer.

9. The thermal-type fluid flow sensor according to claim 1, wherein the heating resistive element includes at least one of a metallic nitride compound selected among TiN (titanium nitride), TaN (tantalum nitride), MoN (molybdenum nitride), and WN (tungsten nitride); a metallic silicide compound selected among WSi (tungsten silicide), MoSi (molybdenum silicide), CoSi (cobalt silicide), and NiSi (nickel silicide); and a metallic film composed of at least one of β-Ta (beta tantalum), Mo (molybdenum), α-Ta (alpha tantalum), Ti (titanium), W (tungsten), Co (cobalt), Ni (nickel), Ta (iron), Nb (niobium), Hf (hafnium), Cr (chromium), Zr (zirconium), Pt (platinum), and Poly-Si.

10. The thermal-type fluid flow sensor according to claim 9, wherein the heating resistive element is formed by materials having a resistance ratio of 100 μΩ·cm or more.

11. The thermal-type fluid flow sensor according to claim 1, wherein the temperature-measuring resistive element for the heating resistive element includes one of a metallic film composed of at least one of Mo (molybdenum), α-Ta (alpha tantalum), Ti (titanium) W (tungsten), Co (cobalt), Ni (nickel), Fe (iron), Nb (niobium), Hf (hafnium), Cr (chromium), Zr (zirconium), Pt (platinum), and β-Ta (beta tantalum); a metallic nitride compound composed of at least one of TiN (titanium nitride), TaN (tantalum nitride), MoN (molybdenum nitride), and WN (tungsten nitride), and a metallic silicide compound selected from among WSi (tungsten silicide), MoSi (molybdenum silicide), CoSi (cobalt silicide) and NiSi (nickel silicide).

12. The thermal-type fluid flow sensor according to claim 11, wherein a resistance temperature coefficient of the temperature-measuring resistive element for the heating resistive element, the upstream and downstream side temperature-measuring resistive elements, and the air temperature-measuring resistive element is 2,000 ppm/° C. or more.

13. The thermal-type fluid flow sensor according to claim 1, wherein a wiring width of the heating resistive element is equal to or wider than a wiring width of the temperature-measuring resistive element for the heating resistive element.

14. The thermal-type fluid flow sensor according to claim 1, wherein a film thickness of the first insulating layer disposed between the heating resistive element and the temperature-measuring resistive element for the heating resistive element is 0.5 μm or less.

15. The thermal-type fluid flow sensor according to claim 1, wherein the first insulating layer is constituted by a multi-layered insulating layer.

* * * * *